United States Patent
Kim (10) Patent No.: US 7,609,419 B2
(45) Date of Patent: Oct. 27, 2009

(54) IMAGE SCANNING APPARATUS AND METHOD

(75) Inventor: Han-Sin Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 913 days.

(21) Appl. No.: 11/002,064

(22) Filed: Dec. 3, 2004

(65) Prior Publication Data
US 2005/0134923 A1    Jun. 23, 2005

(30) Foreign Application Priority Data
Dec. 8, 2003    (KR) .................... 10-2003-0088780

(51) Int. Cl.
*H04N 1/40*    (2006.01)
*H04N 1/38*    (2006.01)

(52) U.S. Cl. .................. 358/461; 358/463; 358/465; 358/444; 382/274

(58) Field of Classification Search .............. 358/461, 358/463, 465, 466, 444, 403; 382/274, 312, 382/318, 319; 399/32
See application file for complete search history.

(56) References Cited

U.S. PATENT DOCUMENTS 6,295,140 B1 * 9/2001 Kameyama ............... 358/461
6,421,146 B1   7/2002 Yoo ........................ 358/461
6,674,977 B2 * 1/2004 Yoo ......................... 399/32
6,788,438 B2 * 9/2004 Takahashi et al. ......... 358/483

FOREIGN PATENT DOCUMENTS

| JP | 07-264400 | 10/1995 |
| JP | 11-027523 | 1/1999 |
| JP | 11-041462 | 2/1999 |
| JP | 2000-115488 | 4/2000 |
| JP | 2001-186342 | 7/2001 |
| JP | 2001-285594 | 10/2001 |

* cited by examiner

*Primary Examiner*—Cheukfan Lee
(74) *Attorney, Agent, or Firm*—Roylance, Abrams, Berdo & Goodman, LLP (57) ABSTRACT

An image scanning apparatus and method are provided in which shading data of the image scanning apparatus is acquired when manufacturing the image scanning apparatus, which is when a white reference or the shading data is cleanest. An original document is scanned using the shading data acquired when manufacturing the image scanning apparatus and shading data of non-contaminated regions of a white reference or shading reference, thereby eliminating distortion such as white lines in an image caused by pollutants stuck to the shading reference or the white reference and improving the performance of the image scanning apparatus. The apparatus and method includes acquiring the shading data when manufacturing the image scanning apparatus and storing the shading data in a memory, and comparing the shading data acquired when manufacturing the image scanning apparatus with shading data acquired when using the image scanning apparatus and, based on the result of the comparison, processing the image of the original document.

9 Claims, 6 Drawing Sheets

IMAGE SCANNING APPARATUS AND METHOD

PRIORITY

This application claims the benefit under 35 U.S.C. 119(a) of Korean Patent Application No. 2003-88780, filed on Dec. 8, 2003, in the Korean Intellectual Property Office, the content of which is incorporated herein in its entirety by reference.

BACKGROUND OF THE INVENTION

1. Field of the Invention

The present invention relates to an image scanning apparatus and method. More particularly, the present invention relates to an image scanning apparatus and method in which shading data of the image scanning apparatus is acquired when manufacturing the image scanning apparatus, which is when a white reference or the shading data is cleanest, and an original document is scanned using the shading data, thereby eliminating distortion due to white lines in an image caused by pollutants attached to the shading reference or the white reference and improving the performance of the image scanning apparatus.

2. Description of the Related Art

An image scanning apparatus such as a scanner scans printed materials, photographs, or characters/pictures written/drawn by hand into color or black and white images. Image scanning apparatuses are employed in multifunction printers, translators, computers for computer aided design (CAD), facsimiles, character recognizers, and digital copiers, and are divided into sheet-fed systems and flatbed scanning systems. A sheet-fed system such as a facsimile reads a page of an original document, which moves while an image sensor included in the sheet-fed system is stationary. When an automatic document feeder (ADF) is added to the sheet-fed system, multiple pages of the original document can be automatically scanned. On the other hand, a flatbed system such as a copier can scan books as well as a page of an original document. In the flatbed system, the original document is stationary while an image sensor included in the flatbed system moves.

An image sensor such as a charge coupled device (CCD) or a contact image sensor (CIS) produces an electrical signal proportional to the amount of light reflected by the original document. Hence, a pixel pattern corresponding to an original image is generated. An image scanning apparatus including a CCD uses a halogen lamp or a fluorescent lamp as a light source while an image scanning apparatus including a CIS uses a small light emitting diode (LED) as a light source. A black and white CIS reads black and white on an original document using only a green LED. On the other hand, a color CIS detects the amount of each of red, green, and blue (RGB) light beams alternately irradiated from RGB LEDs and reflected from an original document, and recognizes the color of the original document by combining the amount of detected light of each of the RGB light beams.

The amount of light emitted from these small LEDs is very small compared with external light, let alone light emitted from a light source such as a lamp. Therefore, it is very important to prevent the CIS from being exposed to the external light because, when the external light is mixed with the light reflected by the original document, the amount of incident light increases and, accordingly, the CIS detects an image whiter than the original document.

A sheet-fed type image scanning apparatus can easily block the external light since it is not exposed to the external light. However, a flatbed type image scanning apparatus can be exposed to the external light when its scanning cover is open. Therefore, special care is needed to prevent the flatbed image scanning apparatus from being exposed to the external light.

Meanwhile, if the light reflected by an original document is not directly incident on the image sensor or if a deviation occurs due to a tolerance when assembling an optical system, the image sensor fails to measure the exact amount of light reflected by the original document. As a result, an image may be distorted. This is called a shading phenomenon. Generally, an image scanning apparatus corrects shading before scanning the original document such that data can be read at a stable level.

"Shading correction" is a process in which, for example, a white level is adjusted by dummy scanning a shading reference such as a white panel, a white roller, a white bar, or a white sheet before scanning an original document to compensate for shading in which non-uniform luminosity is read. For the shading correction, the shading reference is interposed between a home position of the image sensor and a scanning area.

Figure 1:
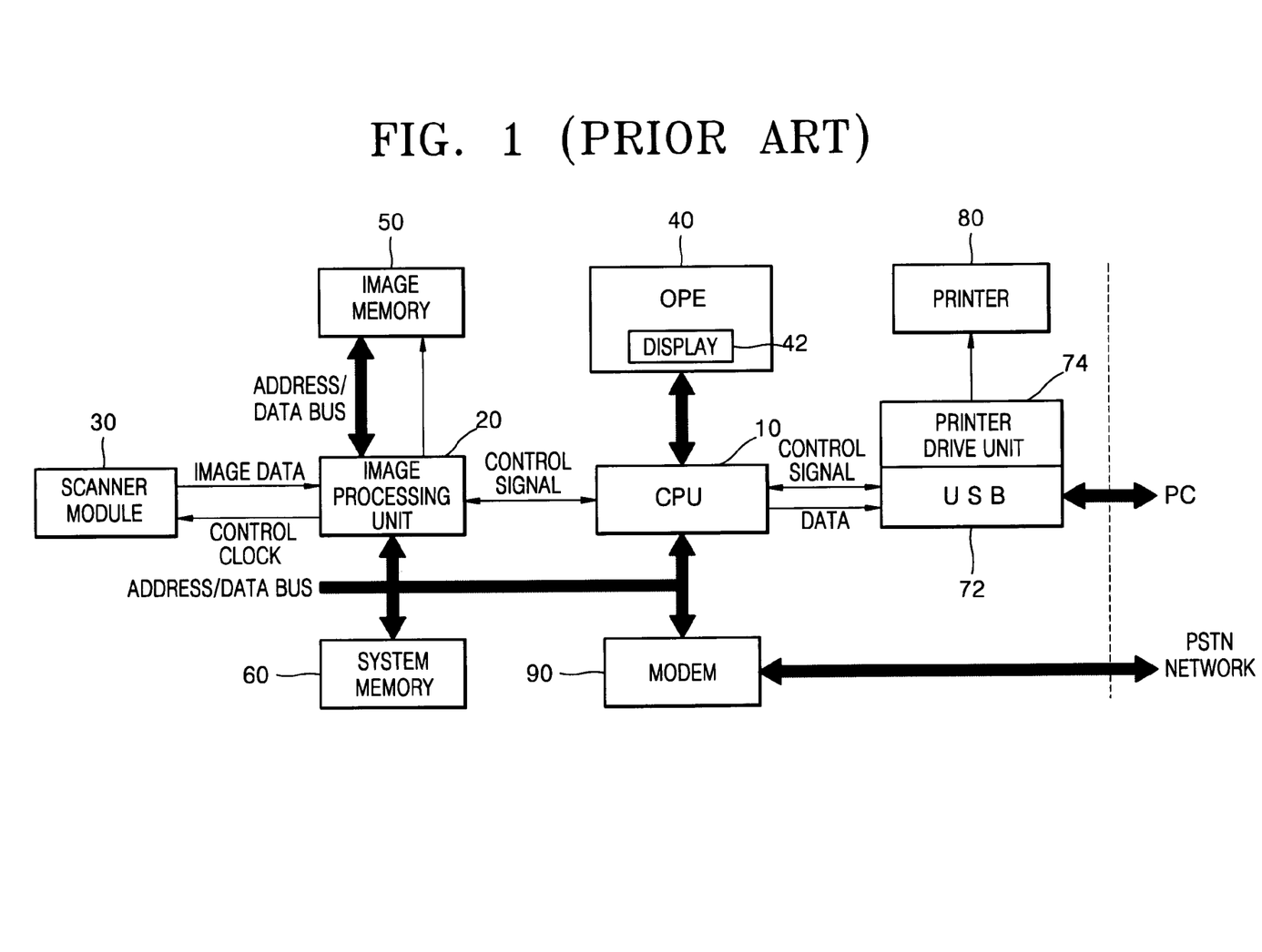
FIG. 1 is a block diagram of a conventional image scanning apparatus.

Shading correction will now be described in more detail with reference to FIG. 1. FIG. 1 is a block diagram of a conventional multifunction printer (MFP) including an image scanning apparatus. The multifunction printer performs the functions of a printer, a copier, a scanner, and a facsimile. Referring to FIG. 1, a central processing unit (CPU) 10 controls the entire operation of the MFP and a system memory 60 including a program driving the MFP. The CPU 10 exchanges key input data and data that can be displayed on a display 42 with an operation panel (OPE) 40 including a microcomputer via a universal asynchronous receiver transmitter (UART) channel using serial communications. Typically, the display 42 is a liquid crystal display (LCD). The CPU 10 controls an image processing unit 20 for processing an image to be scanned by a scanner module 30. The CPU 10 controls a modem 90 for transmitting/receiving data to/from an external device via a public switched telephone network (PSTN). The CPU 10 also controls a universal serial bus (USB) 72 for transmitting/receiving image data to/from a personal computer (PC).

A printer drive unit 74 controls printing when print data from the PC or fax data is received. The image processing unit 20 performs shading/gamma corrections, enlargement/reduction conversions, edge emphasis, or error diffusion on image data received from the scanner module 30. The scanner module 30 scans an original document. The scanner module 30 includes RGB LEDs as an image sensor as well as a light source, and a lens.

The OPE 40 can include, for example, 3×4 telephone button keys and other functional keys. The display 42 displays the current status of the multifunction printer. An image memory 50 stores the image data to be processed by the image processing unit 20. The system memory 60 includes a flash memory storing entire programs of the multifunction printer and a volatile synchronous dynamic random access memory (SDRAM) for processing other data. A printer 80 prints data received from the printer drive unit 74.

Figure 2:
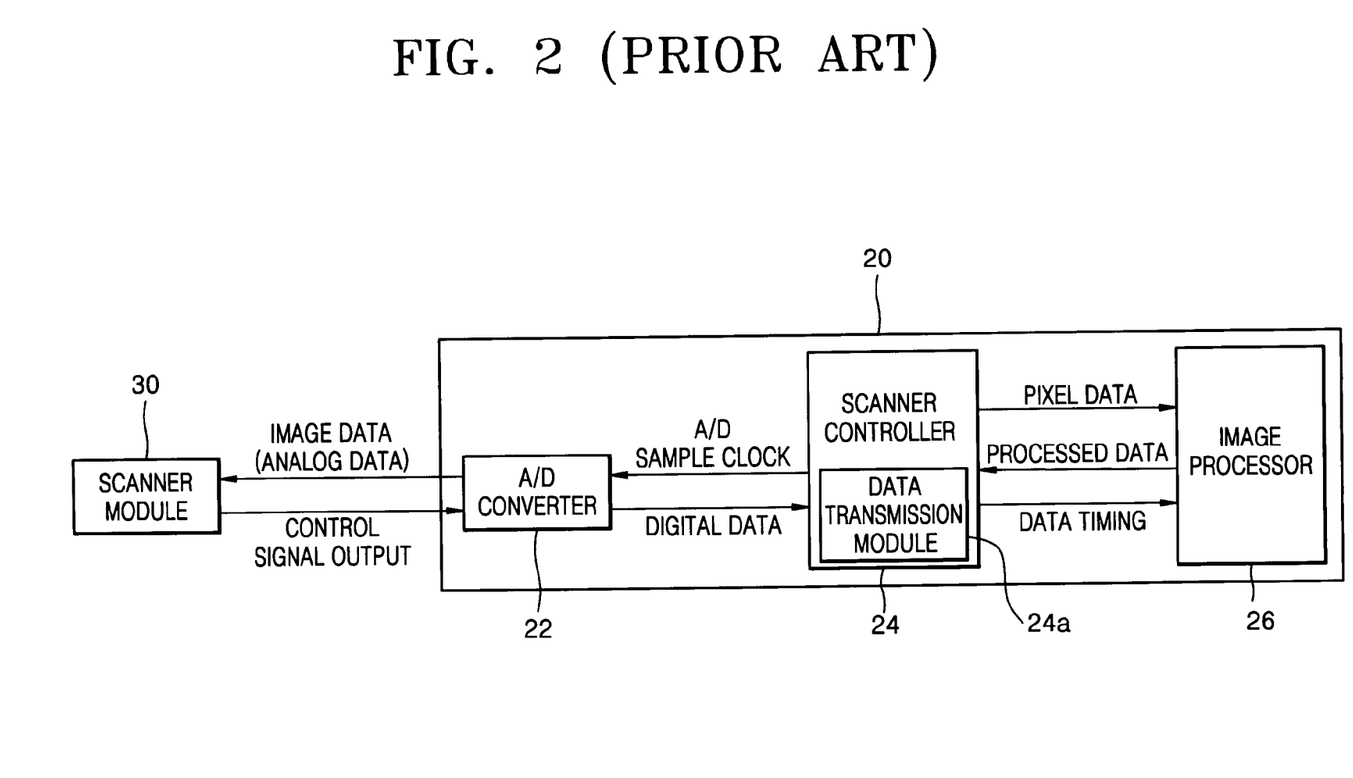
FIG. 2 is a block diagram of an image processing unit of the conventional image apparatus of FIG. 1.

FIG. 2 is a block diagram of the image processing unit 20 of the conventional image scanning apparatus of FIG. 1. Referring to FIG. 2, the image processing unit 20 includes an analog/digital (A/D) converter 22, a scanner controller 24, and an image processor 26. The A/D converter 22 converts analog image data received from the scanner module 30 into digital image data. The scanner controller 24 includes a data transmission module 24a and generates a master clock signal, a shift register clock signal, and a transmission gate clock signal.

The MFP in such a structure corrects shading as follows. Light emitted from an LED of the scanner module 30 is reflected by a shading reference such as a white panel, a white roller, a white bar, or a white sheet, and incident on an image sensor. The image sensor generates a voltage proportional to the amount of the incident light. The A/D converter 22 of the image processing unit 20 converts analog image data output from the image sensor into digital image data. The digital image data of the shading reference, i.e., luminosity, should be maintained at a certain level.

However, when the light reflected by the shading reference is not precisely incident on the image sensor, the voltage output from the image sensor decreases. Accordingly, the white level is reduced, thereby causing shading of an image.

In a conventional shading correction method, a shading correction factor corresponding to the reduced white level is calculated such that the value of luminosity obtained by scanning the shading reference is maintained at a predetermined value. The detected shading correction factor is applied to each pixel of data scanned from the original document. Shading data for correcting the reduced white level is added to the scanned data, thereby correcting the distorted image.

In this method, when scanning the original document, shading is compensated for in consideration of a case where the light emitted from the LED is not directly incident on the image sensor or where external other light is incident on the image sensor. Therefore, this method has been effective to a certain degree.

Another conventional method similar to this shading correction method is disclosed in U.S. Pat. No. 6,421,146, which is incorporated herein by reference.

In the previous conventional method, however, pollutants such as paper dust or foreign matter attached to the shading reference cannot be properly compensated for. Typically, a shading reference of an image scanning apparatus is exposed to paper dust or foreign matter that enters the image scanning apparatus when scanning an original document. Therefore, when white shading data is acquired based on the shading reference while the pollutants are attached to the shading reference, shading correction is performed on the basis of the pollutants. Therefore, when scanning the original image, image quality may be degraded.

This problem is serious for a sheet-fed image scanning apparatus using a white reference exposed externally as a shading reference. In other words, the sheet-fed image scanning apparatus acquires shading data before scanning an original document. However, if the shading reference is contaminated with paper dust or foreign matter, the sheet-fed image scanning apparatus scans the contaminated shading reference and performs shading correction based on the scanning result, thereby degrading image quality.

SUMMARY OF THE INVENTION

The present invention relates to an image scanning apparatus and method, and more particularly, to an image scanning apparatus and method in which shading data of the image scanning apparatus is acquired when manufacturing the image scanning apparatus, which is when a white reference or the shading data is cleanest, and an original document is scanned using the shading data, thereby eliminating distortion such as white lines in an image caused by pollutants attached to the shading reference or the white reference and improving the performance of the image scanning apparatus.

According to an aspect of the present invention, there is provided an image scanning apparatus including a memory for storing shading data acquired when manufacturing the image scanning apparatus; and an image processing unit for comparing the shading data acquired when manufacturing the image scanning apparatus with shading data acquired when using the image scanning apparatus and, based on the result of the comparison, processing an image of an original document.

The image processing unit may determine whether a comparative value of the shading data acquired when manufacturing the image scanning apparatus and the shading data acquired when using the image scanning apparatus is within a predetermined critical value range and process pixels as failed pixels when the comparative value of each of the pixels is not within the predetermined critical value range.

The image processing unit may store a number of failed pixels in an image memory. The image processing unit may also calculate a standard average shading value by dividing an average of the shading data of pixels not including the failed pixels, acquired when using the image scanning apparatus, by an average of the shading data of the pixels not including the failed pixels, acquired when manufacturing the image scanning apparatus, obtain a value for each of the failed pixels by multiplying the standard average shading value by the shading data of the failed pixel values acquired when manufacturing the image scanning apparatus, and sets the value as new shading data of the failed pixels.

According to another aspect of the present invention, there is provided an image scanning method including acquiring shading data when manufacturing an image scanning apparatus and storing the shading data in a memory; and comparing the shading data acquired when manufacturing the image scanning apparatus with shading data acquired when using the image scanning apparatus and, based on the result of the comparison, processing an image of an original document.

The method may further include washing an image sensor and a shading reference of the image scanning apparatus before acquiring the shading data when manufacturing the image scanning apparatus; determining whether a comparative value of the shading data acquired when manufacturing the image scanning apparatus and the shading data acquired when using the image scanning apparatus is within a predetermined critical value range; processing pixels as failed pixels when the comparative value of each of the pixels falls outside the predetermined critical value range; storing a number of failed pixels in an image memory; calculating a standard average shading value by dividing an average of the shading data of pixels not including the failed pixels, acquired when using the image scanning apparatus, by an average of the shading data of the pixels not including the failed pixels, acquired when manufacturing the image scanning apparatus; obtaining a value for each of the failed pixels by multiplying the standard average shading value by the shading data of the failed pixels, acquired when manufacturing the image scanning apparatus, and setting the value as new shading data of the failed pixels; storing the new shading data in the image memory; and scanning the original document using the new shading data and the shading data acquired when using the image scanning apparatus and acquiring scanned data.

BRIEF DESCRIPTION OF THE DRAWINGS

The above and other features and advantages of the present invention will become more apparent by describing in detail exemplary embodiments thereof with reference to the accompanying drawings in which.

DETAILED DESCRIPTION OF THE PREFERRED EMBODIMENTS

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art. Like reference numerals in the drawings denote like elements, and thus their description will be omitted.

Figure 3:
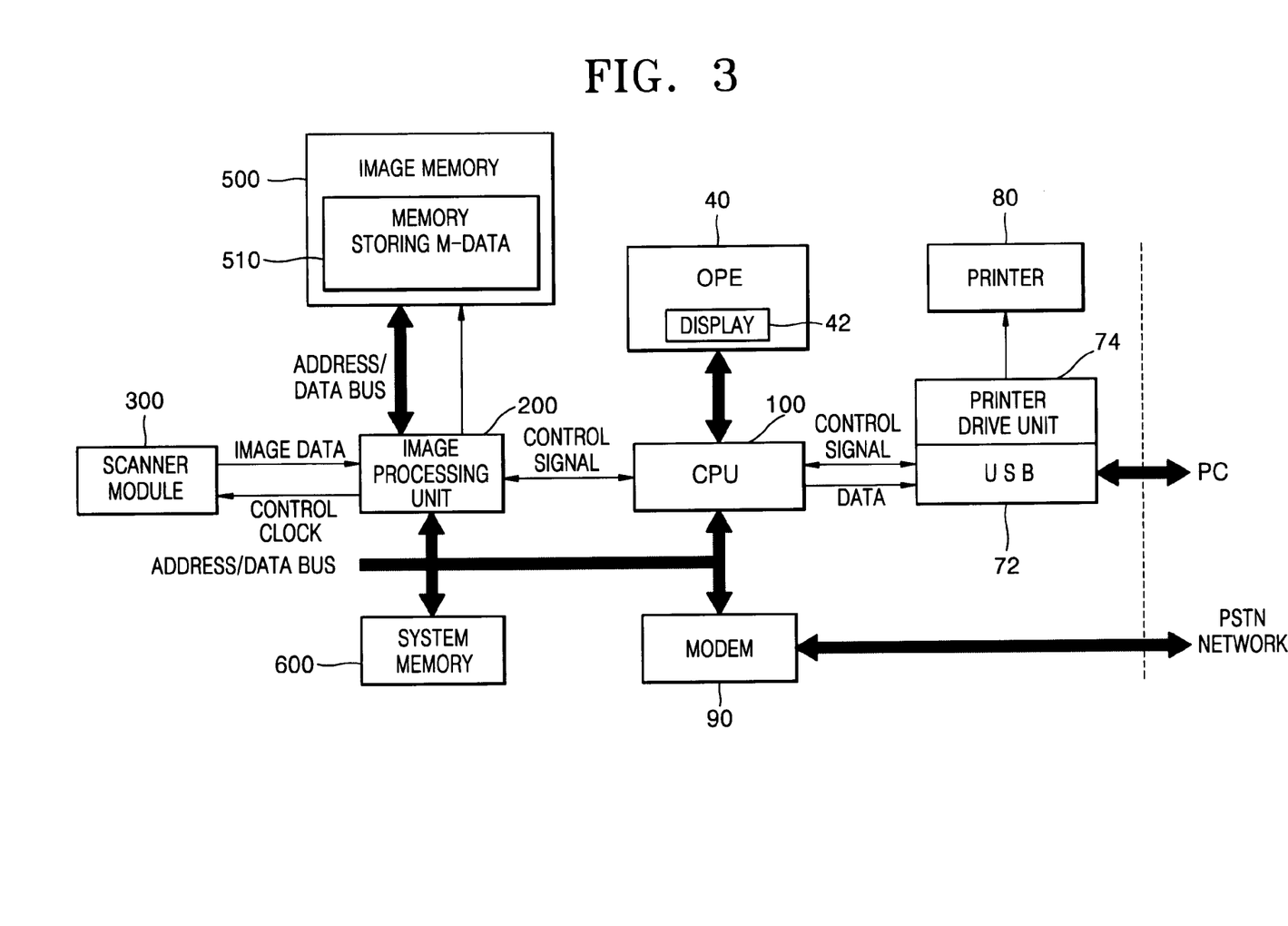
FIG. 3 is a block diagram of an image scanning apparatus according to an embodiment of the present invention.

FIG. 3 is a block diagram of an image scanning apparatus according to an embodiment of the present invention. Referring to FIG. 3, the image scanning apparatus includes a memory 510 and an image processing unit 200. The memory 510 stores shading data M_DATA acquired when manufacturing the image scanning apparatus. The image processing unit 200 compares the shading data M_DATA acquired when manufacturing the image scanning apparatus with shading data U_DATA acquired when using the image scanning apparatus and, based on the result of the comparison, processes scanned image data of an original document. The memory 510 storing the shading data M_DATA is included in an image memory 500 and may be a non-volatile memory. In the present embodiment, the memory 510 storing the shading data M_DATA is included in the image memory 500. However, the memory 510 may be included in a system memory 600 or may be a separate memory.

The image processing unit 200 determines whether a comparative value of the shading data M_DATA acquired when manufacturing the image scanning apparatus and the shading data U_DATA acquired when using the image scanning apparatus is within a predetermined critical value range. If the comparative value is not within the predetermined critical value range, the image processing unit 200 processes a pixel corresponding to the shading data U_DATA as a failed pixel. The comparative value can be determined, for example, by dividing the shading data U_DATA by the corresponding shading data M_DATA. The predetermined critical value range may be between 0.2 and 1.2, for example.

The image processing unit 200 stores the number of failed pixels in the image memory 500. The image processing unit 200 calculates a standard average shading value AVG by dividing the average of the shading data U_DATA of pixels not including the failed pixels by the average of the shading data M_DATA of the pixels not including the failed pixels. Then, the image processing units 200 obtains a value UC_DATA by multiplying the standard average shading value AVG by the shading data M_DATA corresponding to the failed pixels and sets the value UC_DATA as new shading data for the failed pixels.

Figure 4:
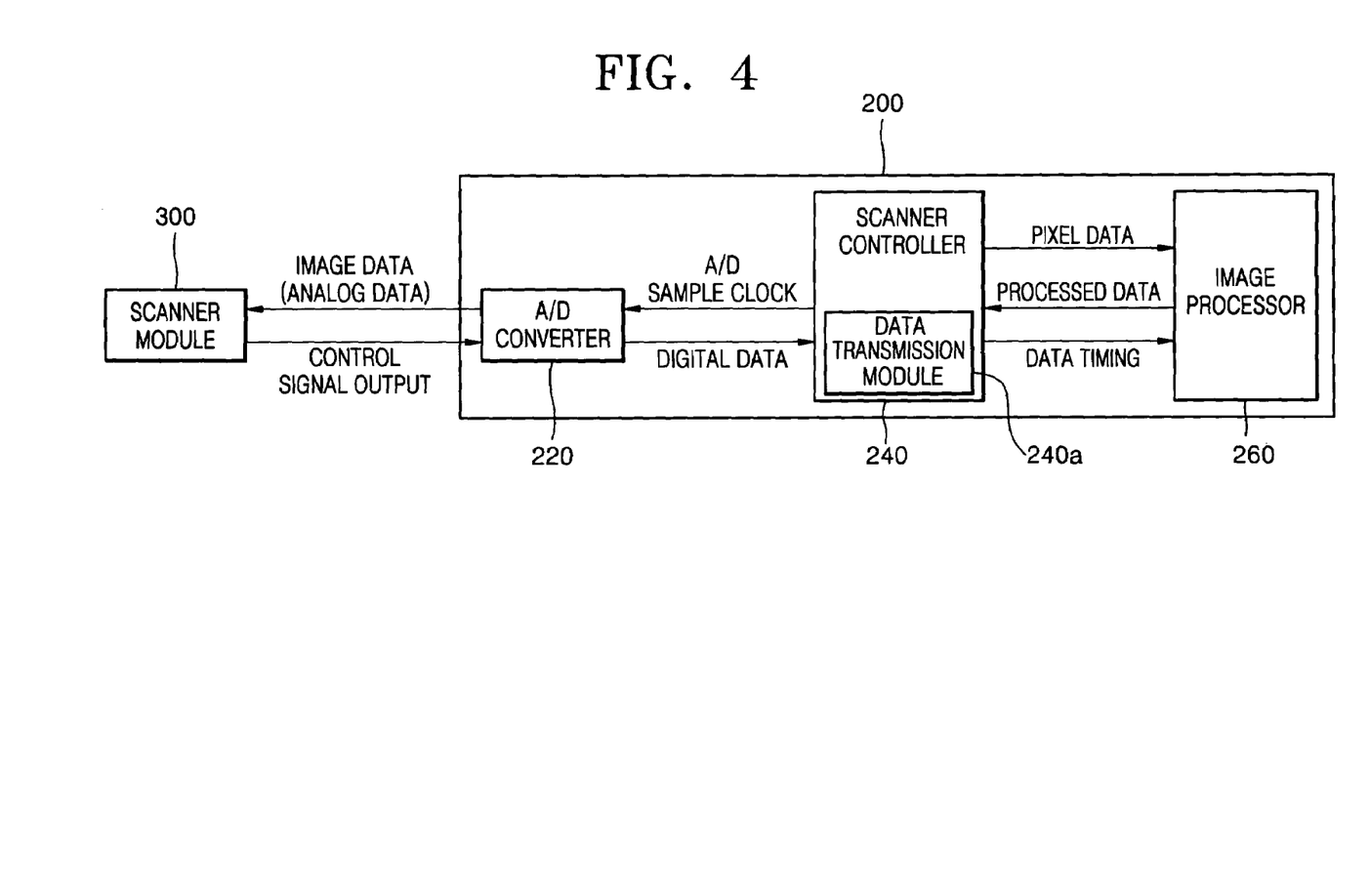
FIG. 4 is a block diagram of an image processing unit of the image scanning apparatus of FIG. 3.

FIG. 4 is a block diagram of the image processing unit 200 of the image scanning apparatus of FIG. 3. Referring to FIG. 4, the image processing unit 200 includes an analog/digital (A/D) converter 220, a scanner controller 240, and an image processor 260. The A/D converter 220 converts analog image data received from the scanner module 300 into digital image data. The scanner controller 240 generates a master clock signal, a shift register clock signal, and a transmission gate clock signal, which are clock signals for driving an image sensor, and includes a data transmission module 240a.

Referring to FIG. 3, the image sensor and a shading reference of the scanner module 300 are cleaned and the shading data M_DATA is acquired when manufacturing the image scanning apparatus. The system memory 600 includes a program for implementing an image scanning method, which will be described later with reference to FIGS. 5 and 6. The CPU 100 controls the image processing unit 200 and the system memory 600.

Elements of FIGS. 3 and 4 perform the same functions as the corresponding elements of FIGS. 1 and 2. However, the CPU 100, the image processing unit 200, the scanner module 300, the image memory 500, and the system memory 600 perform additional functions, which are illustrated in FIGS. 5 and 6.

Figure 5:
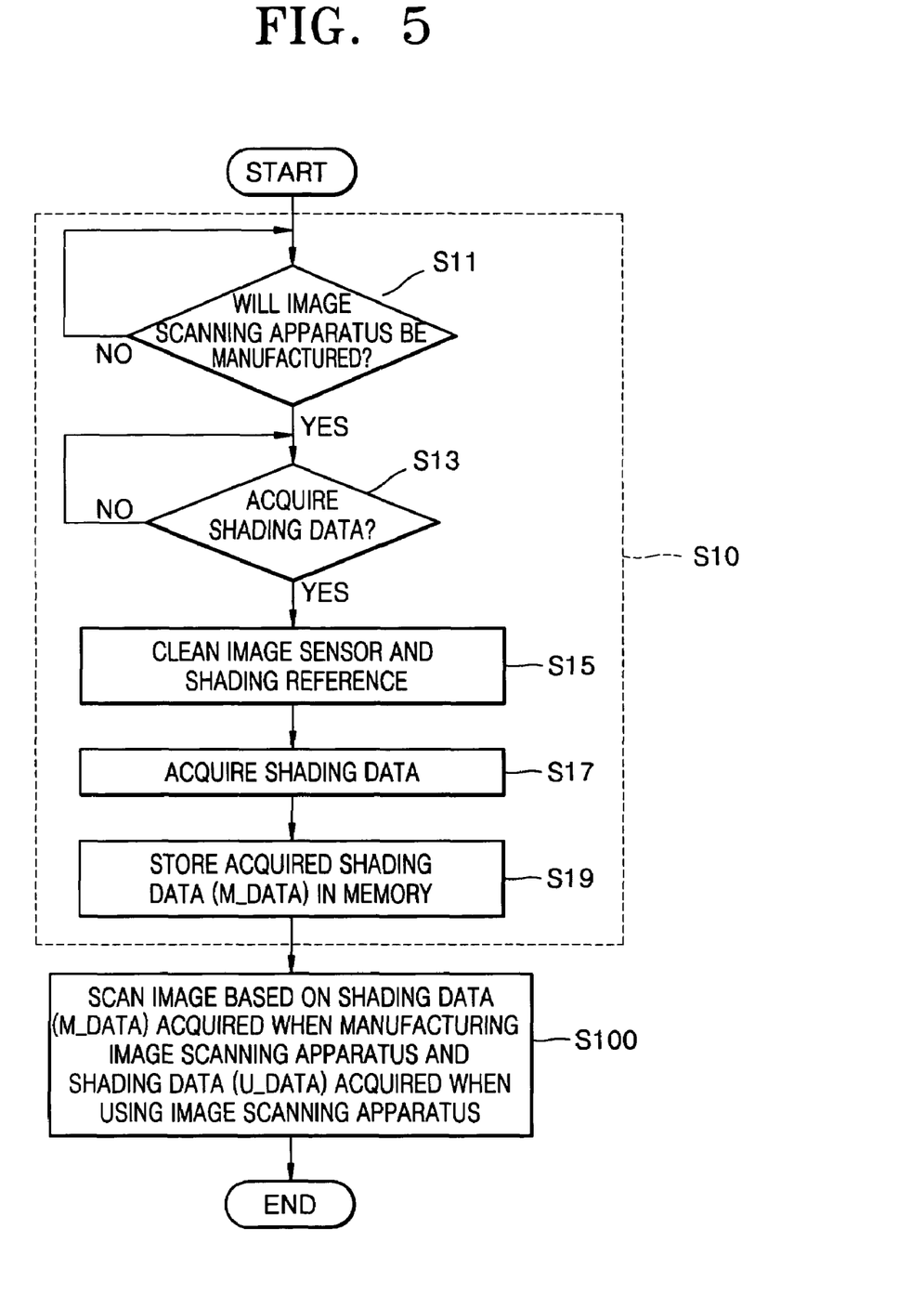
FIG. 5 is a flow chart illustrating an image scanning method when manufacturing an image scanning apparatus according to an embodiment of the present invention.
Figure 6:
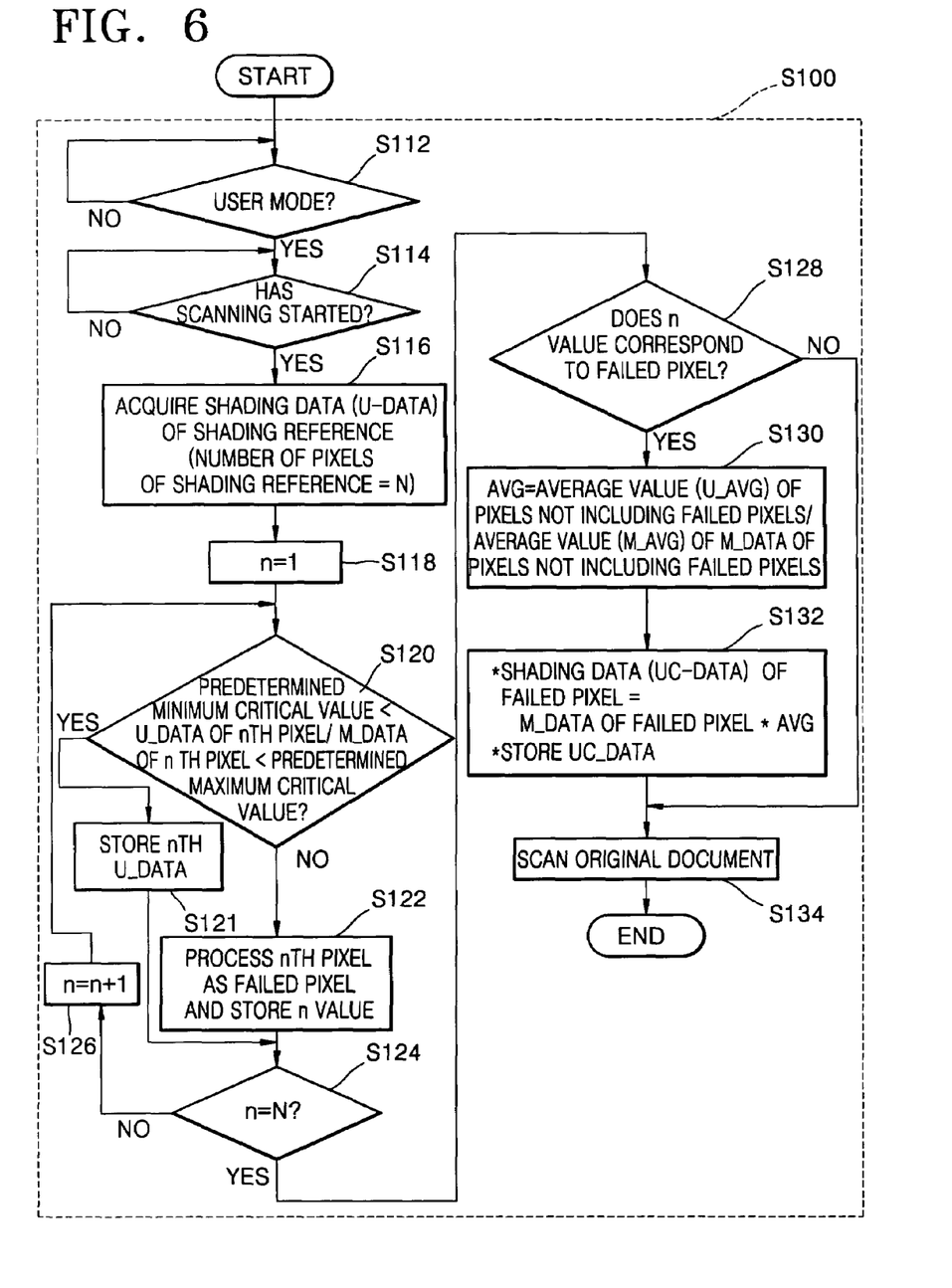
FIG. 6 is a flow chart illustrating an image scanning method when using an image scanning apparatus according to an embodiment of the present invention.

FIG. 5 is a flow chart illustrating an image scanning method when manufacturing an image scanning apparatus according to an embodiment of the present invention. Referring to FIG. 5, manufacturing the image scanning apparatus at step S10 includes determining whether or not to acquire the shading data M_DATA at steps S11 and S13. When it is determined that the shading data M_DATA will be acquired, the image sensor and the shading reference are cleaned such that the shading data M_DATA acquired will be correct at step S15. Thereafter, the shading data M_DATA of the image scanning apparatus being manufactured is acquired at step S17 and stored in a shading data memory 510 at step S19.

In other words, in response to a control signal generated by the CPU 100, the image processing unit 200 acquires the shading data M_DATA for each pixel of the shading reference (or a white reference) when manufacturing the image scanning apparatus, and stores the acquired shading data M_DATA in the shading data memory 510. The shading data M_DATA includes shading data regarding red, green, and blue (RGB) and is stored in the shading data memory 510, which is a non-volatile memory.

A worker on an image scanning apparatus assembly line cleans the image sensor and the shading reference before the shading data M_DATA is acquired. The worker also operates the image scanning apparatus being manufactured such that the shading data M_DATA can be stored in the shading data memory 510 at step S100.

FIG. 6 is a flow chart illustrating an image scanning method when using an image scanning apparatus according to an embodiment of the present invention. Referring to FIG. 6, when using the image scanning apparatus at step S100, it is determined whether the image scanning apparatus is in a user mode at step S112 and whether scanning of an original document has started at step S114. In other words, when a user operates the operation panel 40 to scan the original document, the CPU 100 controls the image processing unit 200 to scan the shading reference before scanning the original document and acquires shading data U_DATA at step S116.

In the present embodiment, it is assumed that the number of pixels acquired by scanning the shading reference is N. The CPU 100 controls the image processing unit 200 to acquire N shading data U_DATA, i.e., first shading data U_DATA_1 corresponding to a first pixel (n=1) of the shading reference through $N^{th}$ shading data U_DATA_N corresponding to an $N^{th}$ pixel of the shading reference at steps S118, S124, and S126.

In response to a control signal generated by the CPU 100, the image processing unit 200 obtains a value DIV_DATA_n ($1 \leq n \leq N$) by dividing the shading data U_DATA_n by the corresponding shading data M_DATA_n (i.e., U_DATA_n/M_DATA_n). Then, the image processing unit 200 determines whether the value DIV_DATA_n is within a predetermined critical value range, for example, between 0.8 and 1.2 at step S120. When the value DIV_DATA_n is within the predetermined critical value range, the image processing unit 200 determines that a shading reference of a pixel where the shading data U_DATA_n is acquired is not contaminated with, for example, dust. In this case, the image processing unit 200 stores the shading data U_DATA_n in the image memory 500 as normal shading data at step S121.

When the value DIV_DATA_n is not within the predetermined critical value range, the image processing unit 200 determines that the shading reference of the pixel where the shading data U_DATA_n is acquired is contaminated. In response to the control generated by the CPU 100, the image processing unit 200 processes the shading data U_DATA_n as failed data, i.e. unusable data, and stores an n value of the failed pixel in the image memory 500 at step S122.

The image processing unit 200 performs steps S120 through S126 for the first through $N^{th}$ pixels in response to the control signal generated by the CPU 100. The image processing unit 200 determines whether any of the n values of the pixels are stored in the image memory 500 in response to the control signal generated by the CPU 100 at step S128. If none of the n values of the pixels are stored in the image memory 500, the CPU 100 scans the original document using the shading data U_DATA stored in the image memory 500 at step S134. If any of the n values are stored in the image memory 500, the image processing unit 200 calculates an average value of the shading data U_DATA of pixels not including the failed pixels and an average value of the shading data M_DATA of the pixels not including the failed pixels in response to the control signal received from the CPU 100. Then, the image processing unit 200 calculates a standard average shading value AVG by dividing the average value of the shading data U_DATA by the average value of the shading data M_DATA in response to the control signal generated by the CPU 100 at step S130.

In response to the control signal generated by the CPU 100, the image processing unit 200 obtains shading data UC_DATA by multiplying the standard average shading value AVG by the shading data M_DATA of each of the failed pixels and determines the shading data UC_DATA as new shading data for the failed pixels at step S132. To use the shading data UC_DATA as the new shading data of the failed pixels, the shading data UC_DATA is stored in the image memory 500. The CPU 100 scans the original document using the normal shading data U_DATA and the new shading data UC_DATA stored in the image memory 500 (S134).

In this way, distortion such as white lines in an image caused by pollutants attached to the shading reference can be prevented, thereby improving the performance of the image scanning apparatus.

As described above, in an image scanning apparatus and method according to embodiments of the present invention, shading data of the image scanning apparatus is acquired when manufacturing the image scanning apparatus, which is when a white reference or a shading data is cleanest. Then, the shading data acquired when manufacturing the image scanning apparatus and shading data of non-contaminated regions of a white reference or shading reference are used when scanning an original document, thereby eliminating distortion such as white lines in an image caused by pollutants stuck to the shading reference or the white reference and improving the performance of the image scanning apparatus.

While the present invention has been particularly shown and described with reference to exemplary embodiments thereof, it should be understood by those of ordinary skill in the art that various changes in form and details may be made therein without departing from the spirit and scope of the present invention as defined by the following claims.

What is claimed is:

1. An image scanning apparatus comprising:
   a memory for storing shading data acquired when manufacturing the image scanning apparatus;
   an image processing unit for comparing the shading data acquired when manufacturing the image scanning apparatus with shading data acquired when using the image scanning apparatus and, based on the result of the comparison, processing an image of an original documents,
   wherein the image processing unit determines whether a comparative value of the shading data acquired when manufacturing the image scanning apparatus and the shading data acquired when using the image scanning apparatus is within a predetermined critical value range and processes pixels as failed pixels when the comparative value of each of the pixels is not within the predetermined critical value range, and
   wherein the image processing unit calculates a standard average shading value by dividing an average of the shading data of pixels not including the failed pixels, acquired when using the image scanning apparatus, by an average of the shading data of the pixels not including the failed pixels, acquired when manufacturing the image scanning apparatus, obtains a value for each of the failed pixels by multiplying the standard average shading value by the shading data of the failed pixels acquired when manufacturing the image scanning apparatus, and sets the value as new shading data of the failed pixels.

2. The image scanning apparatus of claim 1, wherein the image processing unit stores a number of failed pixels in an image memory.

3. The image scanning apparatus of claim 1, wherein the new shading data is stored in the image memory.

4. The image scanning apparatus of claim 1, wherein the image scanning apparatus scans the image on the original document using the new shading data and the shading data acquired when using the image scanning apparatus.

5. An image scanning method comprising:
   acquiring shading data when manufacturing an image scanning apparatus and storing the shading data in a memory;
   comparing the shading data acquired when manufacturing the image scanning apparatus with shading data acquired when using the image scanning apparatus and, based on the result of the comparison, processing an image of an original document;

determining whether a comparative value of the shading data acquired when manufacturing the image scanning apparatus and the shading data acquired when using the image scanning apparatus is within a predetermined critical value range; and processing pixels as failed pixels when the comparative value of each of the pixels falls outside the predetermined critical value range, calculating a standard average shading value by dividing an average of the shading data of pixels not including the failed pixels, acquired when using the image scanning apparatus, by an average of the shading data of the pixels not including the failed pixels, acquired when manufacturing the image scanning apparatus;

obtaining a value for each of the failed pixels by multiplying the standard average shading value of the failed pixels, acquired when manufacturing the image scanning apparatus; and setting the value as new shading data of the failed pixel.

6. The method of claim 5, further comprising washing an image sensor and a shading reference of the image scanning apparatus before acquiring the shading data when manufacturing the image scanning apparatus.

7. The method of claim 5, further comprising storing a number of failed pixels in an image memory.

8. The method of claim 7, further comprising storing the new shading data in the image memory.

9. The method of claim 5, further comprising scanning the original document using the new shading data and the shading data acquired when using the image scanning apparatus, thereby acquiring scanned data.

* * * * *

UNITED STATES PATENT AND TRADEMARK OFFICE
CERTIFICATE OF CORRECTION

| | | |
|---|---|---|
| PATENT NO. | : 7,609,419 B2 | Page 1 of 1 |
| APPLICATION NO. | : 11/002064 | |
| DATED | : October 27, 2009 | |
| INVENTOR(S) | : Han-Sin Kim | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1320 days.

Signed and Sealed this

Twelfth Day of October, 2010

David J. Kappos
*Director of the United States Patent and Trademark Office*